United States Patent
Kell et al.

(10) Patent No.: US 8,594,868 B2
(45) Date of Patent: Nov. 26, 2013

(54) CONTROLLER AND METHODS OF CONTROLLING A PERSONAL ELECTRIC MOTORIZED VEHICLE BASED ON A WEIGHT OF AN OPERATOR

(75) Inventors: Roy Kell, Sugar Grove, IL (US); Alyn Brown, North Aurora, IL (US)

(73) Assignee: Control Solutions LLC, North Aurora, IL (US)

( * ) Notice: Subject to any disclaimer, the term of this patent is extended or adjusted under 35 U.S.C. 154(b) by 645 days.

(21) Appl. No.: 12/533,730

(22) Filed: Jul. 31, 2009

(65) Prior Publication Data
US 2011/0029169 A1 Feb. 3, 2011

(51) Int. Cl.
*A61G 5/04* (2013.01)
*G01G 19/44* (2006.01)

(52) U.S. Cl.
USPC .................. 701/22; 701/301; 180/907

(58) Field of Classification Search
None
See application file for complete search history.

(56) References Cited

U.S. PATENT DOCUMENTS

| | | |
|---|---|---|
| 3,732,938 A | 5/1973 | Nelson |
| 5,033,000 A | 7/1991 | Littlejohn et al. |
| 5,070,959 A | 12/1991 | Grabowski |
| 5,248,007 A | 9/1993 | Watkins et al. |
| 5,269,388 A | 12/1993 | Reichow et al. |
| 5,497,056 A | 3/1996 | Kurland et al. |
| 5,555,495 A | 9/1996 | Bell et al. |
| 5,610,814 A * | 3/1997 | Sugioka et al. ................. 701/22 |
| 5,670,853 A | 9/1997 | Bauer |
| 5,747,745 A | 5/1998 | Neuman |
| 6,225,575 B1 | 5/2001 | Hoyland |
| 6,254,126 B1 | 7/2001 | Bauer et al. |
| 6,621,014 B1 | 9/2003 | Tanner et al. |
| 6,871,715 B1 | 3/2005 | Diaz Carmena et al. |
| 6,875,932 B2 | 4/2005 | Tuft |
| 6,931,947 B2 | 8/2005 | Schulze et al. |
| 7,253,366 B2 | 8/2007 | Bhai |
| 7,264,087 B2 | 9/2007 | Hawkins |
| 7,379,793 B2 * | 5/2008 | Wakefield et al. ................. 701/1 |
| 2007/0055424 A1 * | 3/2007 | Peters et al. .................... 701/36 |
| 2007/0256872 A1 | 11/2007 | Yamamuro et al. |
| 2008/0105483 A1 * | 5/2008 | Dugas .......................... 180/273 |

FOREIGN PATENT DOCUMENTS

WO WO2008/036017 A1 * 3/2008

* cited by examiner

*Primary Examiner* — Michael J Zanelli
(74) *Attorney, Agent, or Firm* — Edwards Wildman Palmer LLP (57) ABSTRACT

A personal electric motorized vehicle, a controller for controlling operation of the vehicle, and methods of controlling the vehicle are provided. The vehicle may include a weight determination device for determining a weight of an operator and a controller for controlling operation of the vehicle based on the weight of the operator. A method of controlling the vehicle may include determining a weight of an operator, communicating the weight to a controller, and controlling operation of the vehicle with the controller based on the weight of the operator.

36 Claims, 5 Drawing Sheets

CONTROLLER AND METHODS OF CONTROLLING A PERSONAL ELECTRIC MOTORIZED VEHICLE BASED ON A WEIGHT OF AN OPERATOR

FIELD OF THE INVENTION

The present invention relates generally to controllers for personal electric motorized vehicles and, more particularly, to controllers adapted to adjustably control performance of personal electric motorized vehicles based on a weight of an operator.

BRIEF SUMMARY

In one example, a weight adjustable motor controller is provided.

In another example, a method of controlling a motor with a weight adjustable motor controller is provided.

In yet another example, a controller is provided for controlling a personal electric motorized vehicle based on a weight of an operator.

In still another example, a method is provided for controlling a personal electric motorized vehicle based on a weight of an operator.

In a further example, a personal electric motorized vehicle is provided and includes a plurality of wheels, a seat for supporting an operator, an electric motor adapted to drive the plurality of wheels, a weight determination device adapted to determine a weight of the operator, and a controller in communication with the weight determination device and adapted to control operation of the personal electric motorized vehicle based on the weight of the operator.

In yet a further example, a method of controlling a personal electric motorized vehicle is provided and includes determining a weight of an operator of the personal electric motorized vehicle, communicating the weight of the operator to a controller, and controlling operation of the personal electric motorized vehicle with the controller based on the weight of the operator.

Independent features and independent advantages will become apparent to those skilled in the art upon review of the detailed description, drawings, and claims.

It is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

DETAILED DESCRIPTION

Figure 1:
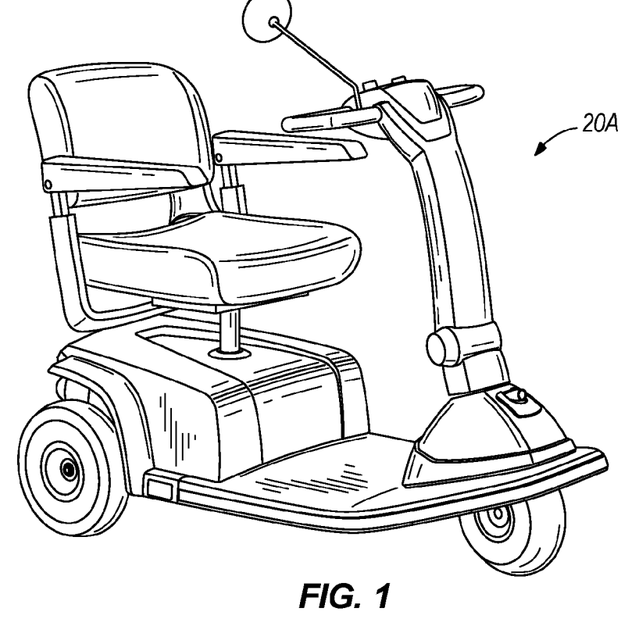
FIG. 1 a perspective view of an exemplary personal electric motorized vehicle.
Figure 2:
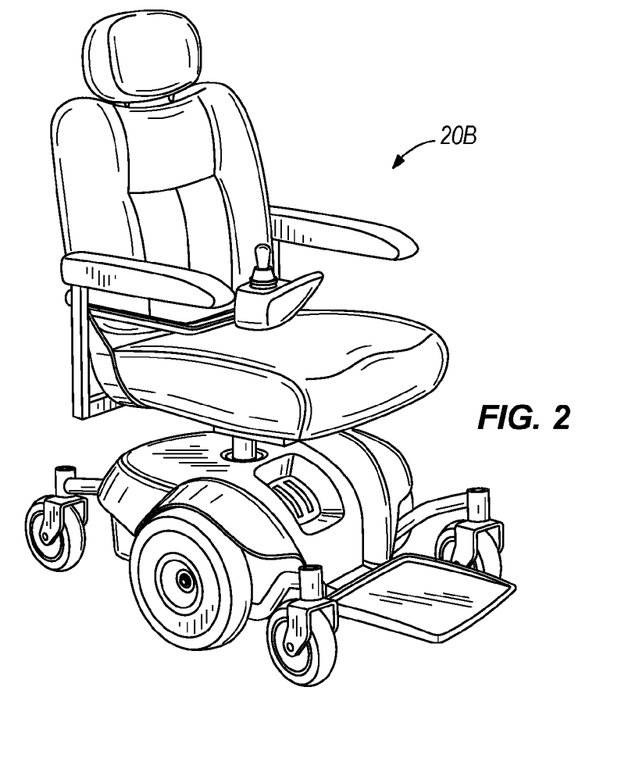
FIG. 2 is a perspective view of another exemplary personal electric motorized vehicle.

Personal motorized vehicles are popular choices for carrying out the transportation needs of individuals that are handicapped, overweight, non-ambulatory, or otherwise unable to efficiently get around. Personal motorized vehicles are also used in industrial environments for transporting an individual or individuals and a load (e.g., product, supplies, etc.). Such personal motorized vehicles may be referred to as industrial personal motorized vehicles and may include, for example, carts, flatbeds, etc. All of such personal motorized vehicles are commonly electrically powered and comprise a variety of different types of electric vehicles including, but not limited to, electric motorized wheelchairs, electric motorized scooters, electric motorized beds, or any other electrically driven vehicles. With reference to FIGS. 1 and 2, exemplary personal electric motorized vehicles 20 are illustrated. More particularly, FIG. 1 illustrates an exemplary electric motorized scooter 20A and FIG. 2 illustrates an exemplary electric motorized wheelchair 20B.

Some conventional personal electric motorized vehicles include an electric motor and a throttle selectively manipulatable by an operator (i.e., person riding the personal electric motorized vehicle) to control operation of the motor and, more particularly, control the speed, acceleration, and deceleration at which the motor operates. The operation and performance of the throttle and motor are predetermined in the factory or during production of the personal motorized vehicle and may not be changed once the personal motorized vehicle leaves the factory. In other words, a distributor, other sales entity of the personal motorized vehicle, or a consumer, may not change or personalize the operation and performance of the personal motorized vehicle. In other conventional personal electric motorized vehicles, the operation and performance of the vehicle may be predetermined in the factory and the operation and performance of the vehicle may only be altered after production by a qualified individual such as, for example, a service technician or engineer, via a handheld programmer.

Such non-existent or limited control adjustability of personal motorized vehicles has proven to be a danger or liability to the operator of the vehicle. For example, consumers purchasing a conventional personal motorized vehicle may vary significantly in weight from one to another, and appropriate control of the personal motorized vehicle for an operator of one weight may not be appropriate for an operator of a second weight. With non-existent or limited control adjustability of the personal motorized vehicle such as static top speed, static acceleration rate, and static deceleration rate, the predetermined control parameters may be appropriate for one operator having a relatively light weight (e.g., less than 350 pounds), but may not be appropriate for another operator having a relatively heavy weight. Operators having a heavier weight facilitate a slower deceleration and stopping weight to the vehicle and provide a higher center of gravity to the vehicle, thereby presenting a greater risk of tipping the vehicle. In the event of a sudden stop or a sharp turn while the personal motorized vehicle is traveling at a high speed, the personal motorized vehicle may tip over or otherwise become unstable when operated by a relatively heavy operator.

Another example where non-existent or limited control adjustability of the personal motorized vehicle may be a danger or liability to operators is in environments where the personal motorized vehicle may have multiple operators. For example, such environments may include hospitals, nursing homes, elderly care facilities, handicap care facilities, bariatric facilities, retail stores, etc. In such instances, the personal motorized vehicle may be operated by people of different weights and, similarly to the reason described above, operation and performance of the personal motorized vehicle may be appropriate for some individuals, but not appropriate for other individuals.

In addition to personal motorized vehicles having multiple operators at different times, the personal motorized vehicles may have the ability to simultaneously support at least one passenger and an operator. That is, a seat may be large enough to accommodate more than one person (e.g., the operator and at least one passenger) or the personal motorized vehicle may include multiple seats. In such instances, non-existent or limited control adjustability of the personal motorized vehicle may be a danger or liability to the operator and passenger(s) because the overall weight of people supported by the vehicle may vary significantly and operation of the vehicle may be appropriate for one overall weight, but not appropriate for another overall weight.

The non-existent or limited control adjustability of the personal motorized vehicle may be appropriate in some environments, but not in other environments. For example, the static top speed, static acceleration, and static deceleration of the personal motorized vehicle may be appropriate for outdoor use, but may not be appropriate for indoor use. The top speed, acceleration rate, and deceleration rate may all be too high for safe operation of the personal motorized vehicle indoors. Indoor environments commonly have narrow hallways or throughways with many corners and blind areas, which provide potential danger to the operator and other individuals within the indoor environments.

Accordingly, a need exists for a personal electric motorized vehicle that safely accommodates operators of varying weights. Also, a need exists for a personal electric motorized vehicle having adjustable control dependent upon the weight of an operator. Further, a need exists for a personal electric motorized vehicle that may safely traverse varying environments.

Figure 3:
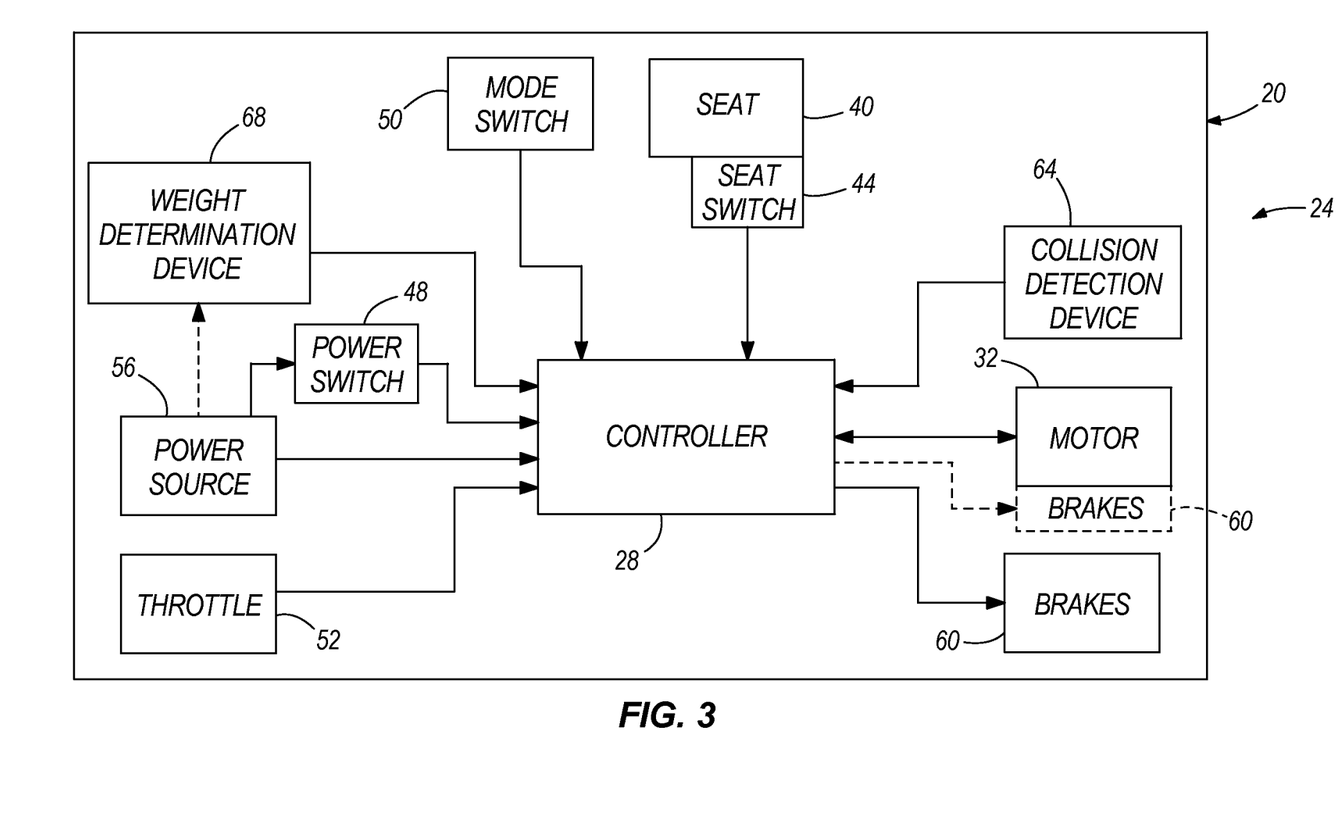
FIG. 3 is a diagram of an exemplary system for controlling performance of a personal electric motorized vehicle based on a weight of an operator.

Referring now to FIG. 3, a diagram of an exemplary adjustable control system 24 for a personal electric motorized vehicle 20 is illustrated. The adjustable control system 24 may be utilized with a wide variety of personal motorized vehicles 20 not limited to the exemplary vehicles 20 illustrated in FIGS. 1 and 2. The adjustable control system 24 may be used on other non-illustrated personal electric motorized vehicles 20 and be within the intended spirit and scope of the present invention.

With continued reference to FIG. 3, the exemplary system 24 generically represents a personal electric motorized vehicle by reference numeral 20 and includes a controller 28. The personal motorized vehicle 20 also includes an electric motor 32 adapted to drive wheels 36 (see FIGS. 1 and 2) and intervening components (e.g., motor output shaft, drive shaft, wheel axle, etc.) to ultimately move the personal motorized vehicle 20 at the discretion of an operator. The electric motor 32 may be any of a wide variety of different types of electric motors and be within the intended spirit and scope of the present invention. The controller 28 is operable to control various components of the vehicle 20 and monitor the components to determine if the components are operational. Operation and control of the controller will become apparent after review of the following description.

The personal motorized vehicle 20 further includes a seat 40 upon which an operator may sit and, in the illustrated embodiment, includes a seat switch 44 associated with the seat 40 to indicate to the controller 28 whether or not an operator is seated upon the seat 40. The seat switch 44 is commonly used as a safety precaution to ensure that an operator is fully and appropriately positioned on the seat 40. A seat switch 44 typically has a weight threshold that must be satisfied or overcome in order for the seat switch 44 to indicate to the controller 28 that an operator is properly positioned on the seat 40. For example, the seat switch 44 may have a minimum weight threshold of 35 pounds, after satisfying which the seat switch 44 will indicate to the controller 28 that it has been activated and operation of the vehicle 20 may commence. The minimum weight threshold of the seat switch 44 is chosen to accommodate variations in operator weights, seat positioning, and bodily structure. The controller 28 will generally prevent operation of the personal motorized vehicle 20 unless it receives indication from the seat switch 44 that it has been activated due to the minimum weight threshold being met or exceeded. It should be understood that a seat switch 44 is not a necessity in the system 24; however, the seat switch 44 provides a useful safety precaution.

In the illustrated exemplary embodiment, the seat 40 is capable of supporting a single operator. In some exemplary embodiments, the seat 40 is sufficiently large to support an operator and at least one passenger. In other exemplary embodiments, the vehicle includes multiple seats 40, one for the operator and at least one additional seat for at least one passenger. Embodiments including multiple seats 40 may include multiple seat switches 44, at least one for each seat 40.

An additional on/off or power switch 48 may be included and manipulatable by an operator to activate and deactivate the personal motorized vehicle 20. The power switch 48 may be used in combination with the seat switch 44 or may be used alone without the seat switch 44. For example, for instances where the power switch 48 is used alone, activation of the power switch 48 is sufficient to allow operation of the vehicle 20. For instances where the seat switch 44 and power switch are used in combination, the controller 28 needs to receive an activation signal from both the seat switch 44 and from the power switch 48 prior to allowing operation of the vehicle 20. If only one of the seat switch 44 or the power switch 48 send an activation signal to the controller 28, then the controller will not allow operation of the vehicle 20.

Additionally, the system 24 may include a mode actuator 50 manipulatable by an operator to change modes of operation of the controller 28 and the personal motorized vehicle 20. The mode actuator 50 may include at least two positions or settings with each position or setting associated with a different environment and including a particular set of operation characteristics for each environment. When the mode actuator 50 is positioned at a particular one of the positions or settings, a set of operation characteristics associated with the position of the mode actuator 50 is sent to the controller 28 and the controller 28 controls the personal motorized vehicle 20 in accordance with the set of operation characteristics. For example, the mode actuator 50 may include two settings, an indoor setting and an outdoor setting, and has a first set of operation characteristics associated with the indoor setting and a second set of operation characteristics associated with the outdoor setting. When the mode actuator 50 is set to the indoor setting, the controller 28 controls the personal motorized vehicle 20 in accordance with the first set of operation characteristics, and when the mode actuator 50 is set to the outdoor setting, the controller 28 controls the personal motorized vehicle 20 in accordance with the second set of operation characteristics. In some exemplary embodiments, the first set of operation characteristics associated with the indoor setting may include a lower top speed, lower acceleration rate, and a higher deceleration rate than the top speed, acceleration rate, and deceleration rate of the second set of operation characteristics associated with the outdoor setting of the mode actuator 50.

Further, the system 24 includes a throttle 52 manipulatable by an operator to control the speed, acceleration, and deceleration of the motor 32. In the exemplary system 24, the throttle 52 communicates its position to the controller 28, thereby identifying the amount of speed, acceleration, and deceleration desired by the operator. The controller 28 then communicates with the motor 32 to drive the motor 32 as desired, and ultimately drives the personal motorized vehicle 20. In some exemplary embodiments, upon start-up of the vehicle 20, the controller 28 will not allow initial operation of the vehicle 20 if it is receiving an input other than zero from the throttle 52 (i.e., the throttle is activated). If the controller 28 allows initial operation of the vehicle 20 when the throttle 52 is activated, the vehicle 20 will immediately accelerate and may catch the operator off-guard, thereby causing injury to the operator or others. The controller 28 also may look to other parameters of the vehicle 20 to determine whether or not to allow start-up of the vehicle. For example, the controller 28 may allow start-up of the vehicle 20 only if it receives signals that the power switch 48 has been activated, the seat switch 44 has been activated, and a zero input signal from the throttle 52.

In the illustrated exemplary embodiment, the system 24 further includes a power source 56 providing power to at least the controller 28, the motor 32, and the power switch 48. In this illustrated exemplary embodiment, the power source 56 provides "raw" or direct power to the controller 28 and motor 32. In order for the controller 28 to switch move or selectively power the motor 32, another line of "raw" or direct power from the power source 56 is sent through the power switch 48. The power source 56 may provide power to other components of the system 24 and be within the intended spirit and scope of the present invention. In some exemplary embodiments, the power source 56 may be a direct current (DC) battery providing DC power to the controller 28 and the motor 32. Alternatively, the power source 56 may be different types of power sources and still be within the intended spirit and scope of the present invention.

With continued reference to FIG. 3, a brake 60 may be employed on the personal motorized vehicle 20 to assist with slowing or stopping the personal motorized vehicle 20. In some exemplary embodiments, the brake 60 may be a conventional type of brake that interacts directly with wheels or tires 36 of the personal motorized vehicle 20 to slow rotation of the wheels or tires 36, thereby slowing movement of the personal motorized vehicle 20. Such exemplary brake embodiments are exemplified by the solid-lined standalone "brake box" illustrated in FIG. 3. In other exemplary embodiments, a brake 60 may be physically integral or coupled with the motor 32. In such exemplary embodiments, the brake 60 may be an electromagnetic disk assembly located on an end of the motor 32 opposite other drive components associated with the motor 32 such as, for example, drive belt, pulley, or gear train for driving the vehicle 20. These exemplary brake embodiments are exemplified by the dashed-line "brake box" extending from the "motor box". In further exemplary embodiments, the controller 28 may communicate with the brake 60 to control operation of the brake 60. In such embodiments, for example, the controller 28 may activate the brake 60 if the personal motorized vehicle 20 is operating in unsafe conditions. In yet other exemplary embodiments, a combination of both controller and manual operation of the brakes 60 may be utilized to control the brakes 60. In further exemplary embodiments, braking of the personal motorized vehicle 20 may be implemented by reverse plugging or dynamic braking. Such exemplary manners of braking the vehicle 20 are performed by the controller 28 using the power source 56 as a load and back-driving the motor 32, which essentially creates a generator that places load on the motor 32 to slow the vehicle 20.

Further, the system 24 may include a collision detection device 64 to assist with inhibiting or limiting the adverse effects of collisions between the personal motorized vehicle 20 and other objects. The collision detection device 64 may be any one of a variety of different types of devices. In some exemplary embodiments, the collision detection device 64 may be an infrared (IR) emitting device emitting IR signals in the direction traveled by the personal motorized vehicle 20. In such exemplary embodiments, detection of an undesirably close object via the IR signals will cause the collision detection device 64 to send an electrical signal to the controller 28 to affect operation of the personal motorized vehicle 20. For example, the controller 28 may activate the brakes 60 or limit the power provided to the motor 32 to slow or stop the personal motorized vehicle 20. In other exemplary embodiments, the collision detection device 64 may be an ultrasonic emitting device emitting ultrasonic waves in the direction traveled by the personal motorized vehicle 20. In such exemplary embodiments, detection of an undesirably close object via the ultrasonic waves will cause the collision detection device 64 to send an electrical signal to the controller 28 to affect operation of the personal motorized vehicle 20. In yet other exemplary embodiments, the collision detection device 64 may be a millimeter (mm) wave radar device emitting millimeter waves in the direction traveled by the vehicle 20. In such exemplary embodiments, detection of an undesirably close object via the millimeter wave radar will case the collision detection device 64 to send an electrical signal to the controller 28 to affect operation of the vehicle 20. In further exemplary embodiments, the collision detection device 64 may comprise one or more flexible or resilient bumpers protruding from the personal motorized vehicle 20. In such exemplary embodiments, engagement of the bumpers with an object will send an electrical signal to the controller 28 to affect operation of the personal motorized vehicle 20. The above exemplary collision detection devices 64 are only a few of the many possible collision detection devices 64 and are not intended to be limiting. Other collision detection devices 64 are contemplated and are within the intended spirit and scope of the present invention.

The system 24 further includes a weight determination device 68 for determining a weight of an operator. The weight determination device 68 communicates the operator's weight to the controller 28, which then controls operation of the personal motorized vehicle 20 based on the weight of the individual. The weight determination device 68 may comprise a variety of different types of devices. The following described devices are only exemplary weight determination devices and other types of weight determination devices are contemplated and are within the intended spirit and scope of the present invention.

Figure 4:
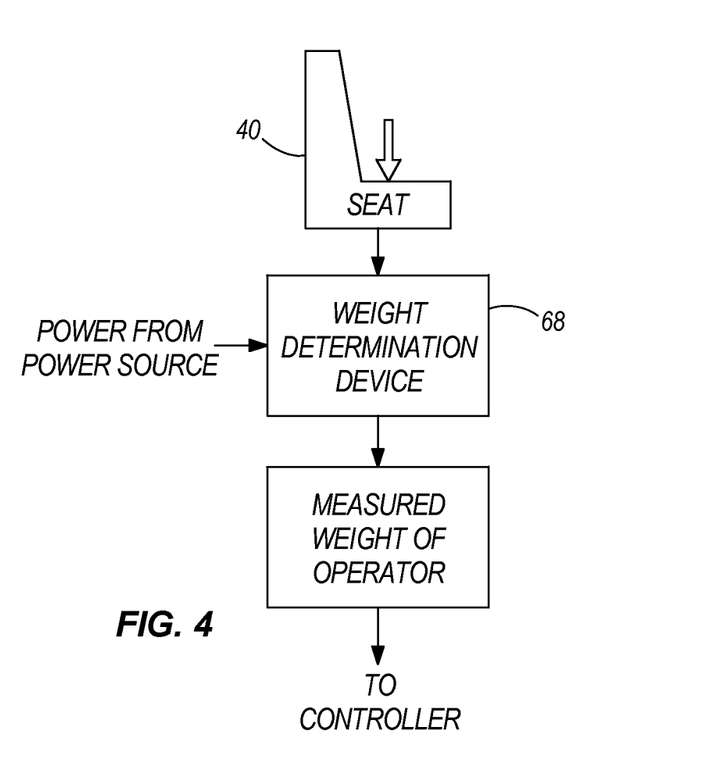
FIG. 4 is an exemplary weight determination device of the system shown in FIG. 3.

With reference to FIGS. 3 and 4, an exemplary weight determination device 68 is illustrated and may be coupled to the seat 40 to directly measure a weight of the operator when the operator sits on the seat 40. Such a weight determination device 68 determines the operator's weight and electrically communicates the measured weight to the controller 28. Exemplary weight determination devices 68 of this type include, but are not limited to, load cells, strain gauges, etc. In such exemplary embodiments, the weight determination device 68 may require power from the power source 56.

Figure 5:
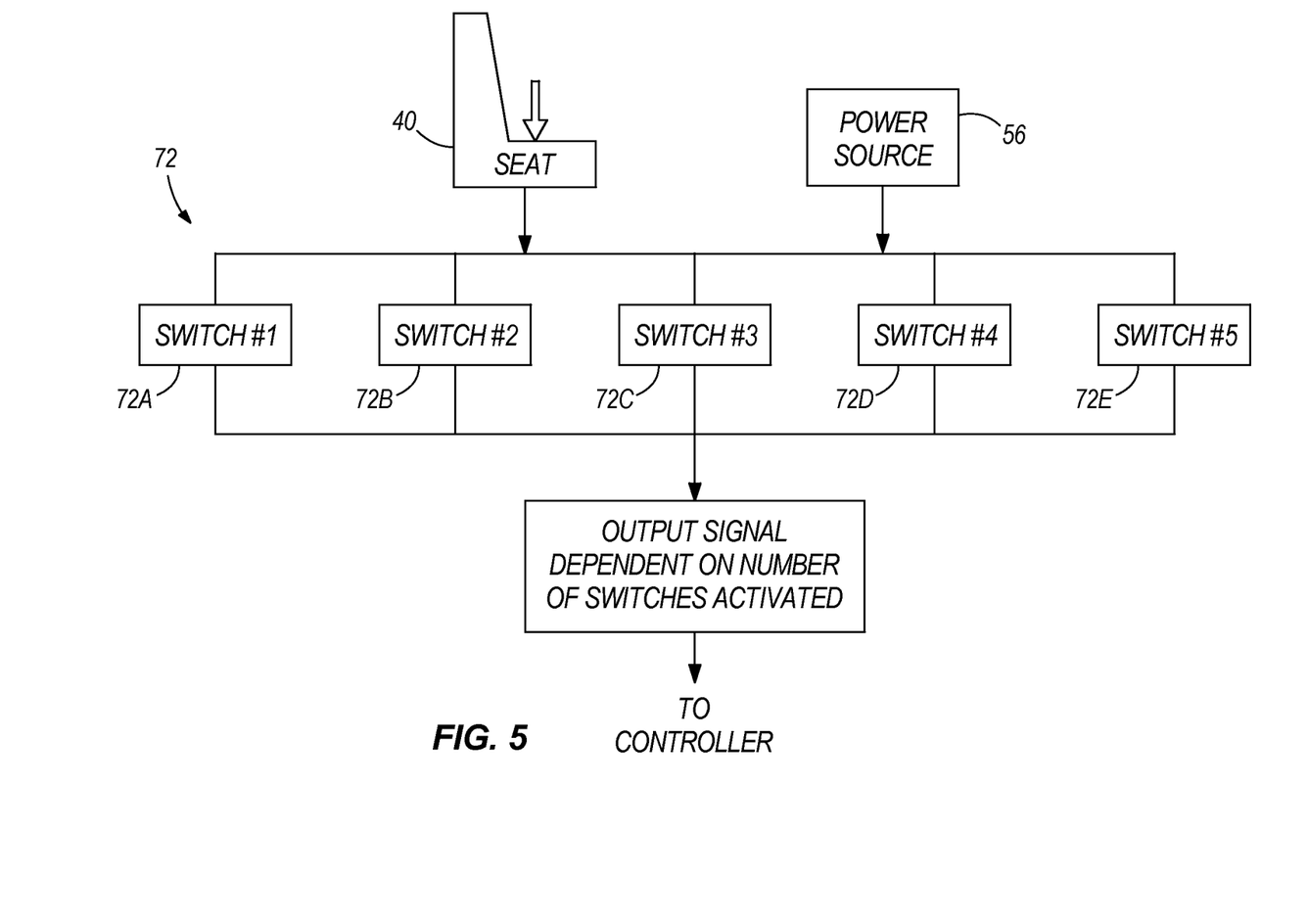
FIG. 5 is another exemplary weight determination device of the system shown in FIG. 3.

Referring now to FIGS. 3 and 5, another exemplary weight determination device 68 is illustrated and may again be coupled to the seat 40 to directly measure a weight of an operator and, in this exemplary embodiment, comprises a plurality of mechanical or electrical switches 72, such as, for example, contact switches, hall-effect sensors, etc., that sequentially activate as the weight of the operator increases. For example, the weight determination device 68 may include five switches 72 with a first switch 72A capable of activating (or closing to create a contact) when an operator's weight exceeds 350 pounds, a second switch 72B capable of activating when an operator's weight exceeds 400 pounds, a third switch 72C capable of being activating when an operator's weight exceeds 450 pounds, a fourth switch 72D capable of activating when an operator's weight exceeds 500 pounds, and a fifth switch 72E capable of activating when an operator's weight exceeds 550 pounds. Depending on the number of switches 72 activated (or closed), a corresponding electrical signal is sent to the controller 28, thereby informing the controller 28 of the approximate weight of the operator. It should be understood that the weight determination device 68 of this exemplary embodiment may include any number of switches 72 and the weight ranges associated with the switches 72 may be any range of weights and still be within the intended spirit and scope of the present invention.

Figure 6:
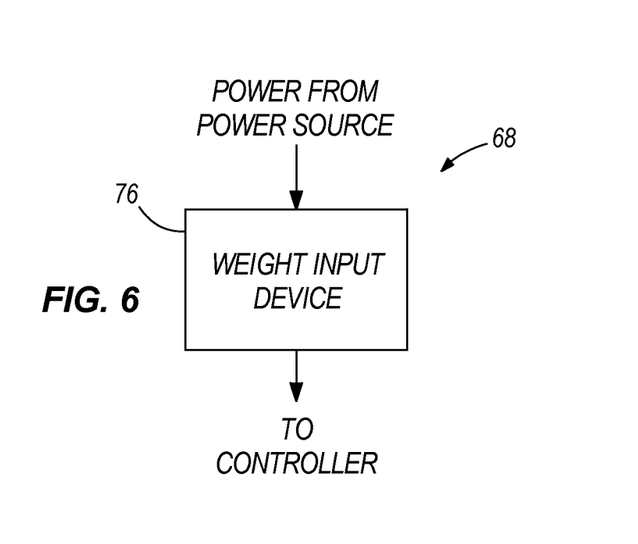
FIG. 6 is a further exemplary weight determination device of the system shown in FIG. 3.

With reference to FIGS. 3 and 6, a further exemplary weight determination device 68 is illustrated and may comprise an input device 76 such as, for example, a keypad, rotatable dial, sliding scale, etc., to facilitate entry of the operator's weight. A wide variety of entities may be capable of entering the operator's weight via the input device 76 such as, for example, the operator, a doctor, nurse, other medical or care giving personnel, sales representative or other employee selling the personal motorized vehicle 20 to the operator, or other individuals. It may be desirable for such a weight determination device 68 to include a lockout or anti-tampering feature to inhibit accidental or unauthorized modifications of the entered weight. Such lockout or anti-tampering feature may require a passcode or key to unlock the input device and facilitate entry of an initial weight or change the entered weight.

Figure 7:
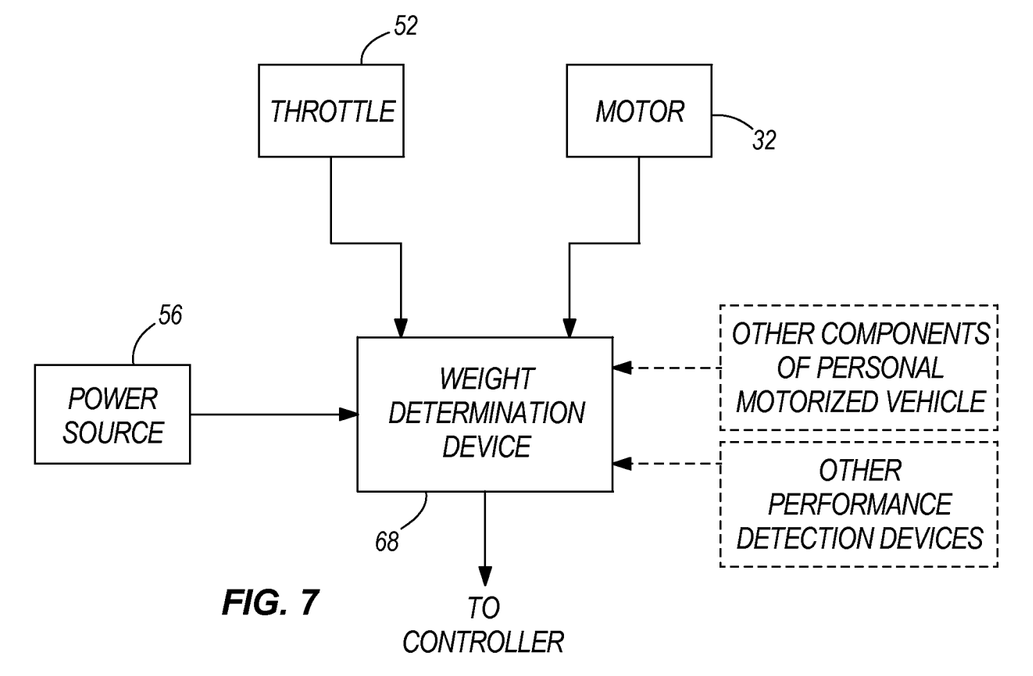
FIG. 7 is yet another exemplary weight determination device of the system shown in FIG. 3.

With reference to FIGS. 3 and 7, yet another exemplary weight determination device 68 is illustrated. In this exemplary embodiment, the weight determination device 68 may assist with determining the operator's weight by receiving performance characteristics from various components of the personal motorized vehicle 20. For example, the weight determination device 68 may receive performance characteristics from the motor 32, the throttle 52, the power source 56, or other components of the personal motorized vehicle 20. Regarding the motor 32, the weight determination device 68 may receive performance characteristics relating to, for example, the work load put on the motor 32, the amount of time taken to reach top speed, amount of time to accelerate or decelerate to particular rates, the amount of power drawn from the motor 32 during acceleration, deceleration, and at top speed, etc. Regarding the motor 32, in some exemplary embodiments, the weight determination device 68 may monitor the back electromagnetic field (emf) of the motor 32 for determining performance characteristics of the motor 32. Regarding the throttle 52, in some exemplary embodiments, the weight determination device 68 may receive performance characteristics relating to, for example, the amount of throttle 52 requested by the operator (i.e., e.g., how far the throttle lever is depressed, rotated, etc.) and the amount of time required by the personal motorized vehicle 20 to reach the performance level associated with the requested amount of throttle 52, etc. Regarding the power source 56, the weight determination device 68 may receive performance characteristics relating to, for example, the amount of power drawn from the power source 56 during particular activities of operation. Upon receipt of one or more of these or other performance characteristics by the weight determination device 68, the weight determination device 68 sends a corresponding electrical signal to the controller 28 where the controller 28 determines the weight of the operator based on the signal received from the weight determination device 68.

It should be understood that the above described and illustrated weight determination devices 68 may comprise mechanical devices, electronics, or combinations of mechanical devices and electronics.

It should also be understood that while the weight determination devices 68 illustrated in the figures are independent entities, the weight determination devices 68 may alternatively be integral with the controller 28. In such exemplary embodiments, the weight determination device 68 may be comprised of hardware logic, software logic, or a combination of hardware and software logic within the controller 28.

Now that components of the system 24 have been described, exemplary operations of the system 24 and exemplary manners of controlling a personal motorized vehicle 20 will be described. It should be understood that the following operations and manners of control are only exemplary of the many possible operations and manners of control capable of being performed by the system 24, and such described exemplary operations and manners of control are not intended to be limiting. Other operations and manners of control are contemplated and are within the intended spirit and scope of the present invention.

In a first exemplary system operation and manner of controlling a personal electric motorized vehicle 20, an operator may sit upon the seat 40 of a personal motorized vehicle 20, and the weight determination device 68 will determine the operator's weight and send an electrical signal to the controller 28 corresponding to the operator's weight. The weight determination device 68 may be any of the exemplary devices described above or any other possible weight determination devices. Upon receipt of the operator's weight by the controller 28, the controller 28 may adjust the performance of the motor 32 based on the operator's weight. For example, the controller 28 may adjust the top speed of motor 32, adjust the acceleration or deceleration of the motor 32, etc. For instances where the operator is relatively light (e.g., less than 350 pounds), the controller 28 may allow the motor 32 to have a higher top speed and higher acceleration and deceleration rates. For instances where the operator is relatively heavy (e.g., greater than 350 pounds), the controller 28 may limit or lower the top speed and/or the acceleration and deceleration rates of the motor 32.

In a second exemplary system operation and manner of controlling a personal motorized vehicle 20, an operator or other personnel may use an input device 76 of the weight determination device 68 to enter the operator's weight into the system 24. The input device 76 may be any of the exemplary devices described above or any other possible input device. The weight determination device 68 then sends an electrical signal to the controller 28 corresponding to the operator's weight. Upon receipt of the operator's weight by the controller 28, the controller 28 may adjust the performance of the motor 32 based on the operator's weight. For example, the controller 28 may adjust the top speed of motor 32, adjust the acceleration or deceleration rates of the motor 32, etc.

The controller 28 may control performance of the motor 32 with either software or hardware, or with a combination of both software and hardware. In software applications, the controller 28 receives signals from the weight determination device 68 and the controller 28 controls performance of the motor 32 in accordance with the controller's control logic. For example, the controller 28 may receive signals from the weight determination device 68 and the throttle 52, and may override the throttle 52 if an operator is requesting more speed or acceleration than is determined to be safe based on the operator's weight. Another exemplary software application may be used in instances where the weight determination device 68 is a strain gauge. For example, a strain gauge, when activated, outputs a continuously variable analog signal associated with an operator's weight that is received by the controller 28, which measures and converts the signal into a digital value. The controller 28 then compares the digital value to its preprogrammed operation parameters established for safe operation based on operator weights and scales or limits throttle inputs dependent on the operator's weight as determined by the strain gauge. In hardware applications, the signal output by the throttle 52 may be scaled or truncated by hardware in accordance with the desired performance of the motor 32 based on an operator's weight. For example, a hardwired configuration or a component such as, for example, a resistor or potentiometer could be used to scale or truncate the output signal of the throttle 52 based on the signal received by the controller 28 from the weight determination device 68.

The above exemplary operations relate to adjusting the performance of the motor 32 based on an operator's weight. It should be understood that other characteristics of the personal motorized vehicle 20 may be adjusted by the controller 28 based on the weight of the operator. In some exemplary embodiments, the controller 28 may communicate with the brakes 60 to activate the brakes 60 in order to maintain acceptable operation parameters of the personal motorized vehicle 20 based on the weight of operator. For example, if the weight determination device 68 indicates that an operator's weight exceeds 350 pounds, the controller 28 may activate the brakes 60 to slow rotation of the wheels or tires 36 when the personal motorized vehicle 20 reaches or exceeds a particular speed. In other exemplary embodiments, the controller 28 may communicate with the throttle 52 to limit or cut-off use of the throttle 52 in order to maintain acceptable operation of the personal motorized vehicle 20 based on the weight of the operator. For example, if the weight determination device 68 indicates that an operator's weight exceeds 350 pounds, the controller 28 may limit the extent to which the throttle 52 may be activated or may only acknowledge a lowered maximum activation extent of the throttle 52, thereby limiting or lowering the top speed of the personal motorized vehicle 20.

In further exemplary embodiments, the system 24 may include a seat switch 44 that activates when an operator properly sits on the seat 40 and, upon activation, the seat switch 44 sends an electrical signal to the controller 28 to indicate that the operator is properly sitting upon the seat 40. Activation of the seat switch 44 allows the personal motorized vehicle 20 to operate. In still other exemplary embodiments, a power switch 48 may be used in combination with the seat switch 44 or in place of the seat switch 44. The power switch must be activated by the operator in order for the personal motorized vehicle 20 to operate. In still further exemplary embodiments, a collision detection device 64 may be used to adjust control of the personal motorized vehicle 20. The collision detection device 64 detects an imminent collision or a collision in its infancy, and sends an electrical signal to the controller 28. Upon receipt of the signal from the collision detection device 64, the controller 28 may adjust the performance of the motor 32 and the personal motorized vehicle 20. This adjusted control may be dependent upon the weight of the operator. For example, upon collision or detection of a potential collision, the controller 28 may communicate with the brakes 60 to activate the brakes 60, thereby slowing or stopping the personal motorized vehicle 20. Also, for example, the controller 28 may communicate with the motor 32 to slow or stop operation of the motor 32, thereby slowing or stopping the personal motorized vehicle 20. Further, for example, the controller 28 may communicate with the throttle 52 to limit or cut-off use of the throttle 52 to prevent continued or additional operation of the motor 32.

It should also be understood that output signals from components of the system 24 may be routed through the weight determination device 68 to be manipulated dependent on an operator's weight. In some exemplary embodiments, output signals of the throttle 52 may be routed to the weight determination device 68 where the weight determination device 68 will attenuate the throttle signal based on the weight of an operator. The attenuated throttle signal is then sent to the controller 28 where the controller 28 controls the motor 32 in accordance with the attenuated throttle signal. In other exemplary embodiments, output signals of the mode switch 50 may be routed to the weight determination device 68 where the weight determination device 68 will attenuate the mode switch output signal based on the weight of an operator. The attenuated mode switch signal is then sent to the controller 28 where the controller 28 controls the motor 32 in accordance with the attenuated mode switch signal.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

The invention claimed is:

1. A personal electric motorized vehicle comprising:
   a plurality of wheels;
   a seat for supporting an operator;
   an electric motor adapted to drive the plurality of wheels;
   a weight determination device adapted to determine a weight of the operator; and
   a controller in communication with the weight determination device and adapted to control operation of the electric motor based on the weight of the operator, wherein the controller controls at least one of a top speed of the electric motor, an acceleration rate of the electric motor, and a deceleration rate of the electric motor.

2. The personal electric motorized vehicle of claim 1, wherein the personal electric motorized vehicle is an electric motorized scooter.

3. The personal electric motorized vehicle of claim 1, wherein the personal electric motorized vehicle is an electric motorized wheelchair.

4. The personal electric motorized vehicle of claim 1, wherein the personal electric motorized vehicle is an electric motorized industrial vehicle.

5. The personal electric motorized vehicle of claim 1, wherein the weight determination device comprises an input device adapted to facilitate input of a weight of an operator, and wherein the controller receives the input weight of the operator and controls operation of the personal electric motorized vehicle dependent on the input weight of the operator.

6. The personal electric motorized vehicle of claim 1, wherein the weight determination device is associated with the seat.

7. The personal electric motorized vehicle of claim 6, wherein the weight determination device determines a weight of an operator when an operator sits on the seat.

8. The personal electric motorized vehicle of claim 6, wherein the weight determination device is a load cell.

9. The personal electric motorized vehicle of claim 6, wherein the weight determination device is a strain gauge.

10. The personal electric motorized vehicle of claim 6, wherein the weight determination device comprises a first switch and a second switch, the first switch associated with a first weight threshold and the second switch associated with a second weight threshold greater than the first weight threshold, and wherein the first switch is adapted to be activated when a weight of an operator exceeds the first weight threshold and the second switch is adapted to be activated when a weight of an operator exceeds the second weight threshold.

11. The personal electric motorized vehicle of claim 1, wherein the weight determination device is adapted to receive at least one performance characteristic from the electric motor and determine a weight of an operator based on the at least one performance characteristic received from the electric motor.

12. The personal electric motorized vehicle of claim 1, further comprising a brake associated with at least one of the plurality of wheels, and wherein the controller controls operation of the brake based on the weight of the operator.

13. The personal electric motorized vehicle of claim 1, further comprising a brake associated with the electric motor, and wherein the controller controls operation of the brake based on the weight of the operator.

14. The personal electric motorized vehicle of claim 1, further comprising a throttle engageable by an operator to affect operation of the electric motor, and wherein the controller receives a signal from the throttle associated with an amount of throttle desired by an operator and controls operation of the vehicle based on the amount of throttle desired and the weight of the operator.

15. The personal electric motorized vehicle of claim 1, further comprising a collision detection device for detecting an object in a path of the personal electric motorized vehicle.

16. The personal electric motorized vehicle of claim 15, wherein, upon detection of an object by the collision detection device, the collision detection device communicates detection of an object to the controller and the controller adjusts operation of the personal electric motorized vehicle.

17. The personal electric motorized vehicle of claim 16, further comprising a brake associated with at least one of the plurality of wheels, and wherein the controller activates the brake upon detection of an object by the collision detection device.

18. The personal electric motorized vehicle of claim 16, wherein the controller adjusts operation of the electric motor upon detection of an object by the collision detection device.

19. The personal electric motorized vehicle of claim 18, wherein the controller performs at least one of deceleration of the electric motor and cut-off operation of the electric motor upon detection of an object by the collision detection device.

20. The personal electric motorized vehicle of claim 1, wherein the operator is a first operator and the weight of the first operator is a first weight, and wherein the seat is adapted to support a second operator and the weight determination device is adapted to determine a second weight of the second operator, the second weight is greater than the first weight, and wherein the controller is in communication with the weight determination device to receive either the first weight or the second weight depending on which one of the first operator or second operator is sitting on the seat and control operation of the personal electric motorized vehicle differently depending on which one of the first operator or second operator is sitting on the seat.

21. The personal electric motorized vehicle of claim 20, wherein the controller controls operation of the personal electric motorized vehicle at a first top speed when the first operator is sitting on the seat and controls the personal electric motorized vehicle at a second top speed when the second operator is sitting on the seat, wherein the first top speed is greater than the second top speed.

22. The personal electric motorized vehicle of claim 20, wherein the controller controls operation of the personal electric motorized vehicle at a first acceleration rate when the first operator is sitting on the seat and controls the personal electric motorized vehicle at a second acceleration rate when the second operator is sitting on the seat, wherein the first acceleration rate is greater than the second acceleration rate.

23. The personal electric motorized vehicle of claim 1, wherein the seat is adapted to support the operator and at least one passenger, and the weight determination device is adapted to determine an aggregate weight of the operator and the passenger, wherein the controller is adapted to control operation of the personal electric motorized vehicle based on the aggregate weight of the operator and the at least one passenger.

24. The personal electric motorized vehicle of claim 1, further comprising a mode actuator movable between a first setting and a second setting, the first setting is associated with a first manner of operating the personal electric motorized vehicle and the second setting is associated with a second manner of operating the personal electric motorized vehicle with the first and second manners of operating being different, and wherein, when the mode actuator is positioned at one of the first and second settings, the controller controls the personal electric motorized vehicle in the one of the first and second manners of operating associated with the one of the first and second settings at which the mode actuator is positioned.

25. The personal electric motorized vehicle of claim 1, wherein the weight determination device is a separate component from the controller.

26. The personal electric motorized vehicle of claim 1, wherein the weight determination device is integral with the controller.

27. The personal electric motorized vehicle of claim 26, wherein the weight determination device comprises logic within the controller.

28. A personal electric motorized vehicle comprising:
  a plurality of wheels;
  a seat for supporting an operator;
  an electric motor adapted to drive the plurality of wheels;
  a weight determination device adapted to determine a weight of the operator; and a controller in communication with the weight determination device and adapted to control operation of the personal electric motorized vehicle based on the weight of the operator, wherein the weight determination device is adapted to receive at least one performance characteristic from the personal electric motorized vehicle and determine a weight of an operator based on the at least one performance characteristic received from the personal electric motorized vehicle.

29. A method of controlling a personal electric motorized vehicle, the method comprising:
   determining a weight of an operator of the personal electric motorized vehicle;
   communicating the weight of the operator to a controller; and
   controlling operation of the electric motor with the controller based on the weight of the operator, wherein the controller controls at least one of a top speed of the electric motor, an acceleration rate of the electric motor, and a deceleration rate of the electric motor.

30. The method of claim 29, wherein determining a weight of an operator further comprises determining a weight of an operator with a weight determination device.

31. The method of claim 30, wherein the weight determination device is a separate component from the controller.

32. The method of claim 30, wherein the weight determination device is integral with the controller.

33. The method of claim 32, wherein the weight determination device comprises logic within the controller.

34. The method of claim 29, wherein controlling operation of the personal electric motorized vehicle further comprises controlling operation of an electric motor of the personal electric motorized vehicle.

35. The method of claim 29, wherein the weight is a first weight and the operator is a first operator, the method further comprising:
   determining a second weight of a second operator of the personal electric motorized vehicle;
   communicating the second weight of the second operator to the controller; and
   controlling operation of the personal electric motorized vehicle with the controller based on the second weight of the second operator.

36. The method of claim 35, wherein controlling operation of the personal electric motorized vehicle further comprises:
   controlling operation of the personal electric motorized vehicle with the controller in a first manner when based on the first weight and in a second manner when based on the second weight, and wherein the first manner is different than the second manner.

* * * * *